United States Patent
Ishii

(10) Patent No.: US 7,952,568 B2
(45) Date of Patent: May 31, 2011

(54) SURFACE ACOUSTIC WAVE TOUCH PANEL, ELECTROOPTICAL DEVICE, AND ELECTRONIC APPARATUS HAVING SPACERS BETWEEN FIRST AND SECOND TOUCH PANEL SUBSTRATES

(75) Inventor: Ryo Ishii, Matsumoto (JP)

(73) Assignee: Sony Corporation, Tokyo (JP)

( * ) Notice: Subject to any disclaimer, the term of this patent is extended or adjusted under 35 U.S.C. 154(b) by 790 days.

(21) Appl. No.: 11/625,415

(22) Filed: Jan. 22, 2007

(65) Prior Publication Data
US 2007/0176907 A1 Aug. 2, 2007

(30) Foreign Application Priority Data

Jan. 27, 2006 (JP) .................................. 2006-019157
Oct. 17, 2006 (JP) .................................. 2006-282377

(51) Int. Cl.
*G06F 3/043* (2006.01)
(52) U.S. Cl. ....................................................... 345/177
(58) Field of Classification Search ................... 345/73, 345/173–177, 34, 85; 428/458
See application file for complete search history.

(56) References Cited

U.S. PATENT DOCUMENTS

| | | | |
|---|---|---|---|
| 5,638,093 A | | 6/1997 | Takahashi et al. |
| 6,078,274 A | * | 6/2000 | Inou ................................ 341/34 |
| 6,078,315 A | * | 6/2000 | Huang .......................... 345/177 |
| 7,710,371 B2 | * | 5/2010 | Mei et al. ......................... 345/85 |
| 2002/0154100 A1 | * | 10/2002 | Hatakeda et al. ............. 345/173 |
| 2002/0171610 A1 | * | 11/2002 | Siwinski et al. ................. 345/76 |
| 2002/0186209 A1 | * | 12/2002 | Cok .............................. 345/173 |
| 2004/0239647 A1 | * | 12/2004 | Endo ............................. 345/173 |
| 2004/0265602 A1 | * | 12/2004 | Kobayashi et al. ........... 428/458 |
| 2005/0088417 A1 | * | 4/2005 | Mulligan ...................... 345/173 |
| 2005/0248547 A1 | * | 11/2005 | Kent et al. ..................... 345/177 |
| 2006/0109261 A1 | * | 5/2006 | Chou et al. .................... 345/177 |
| 2006/0132465 A1 | * | 6/2006 | Nishikawa et al. ........... 345/174 |
| 2006/0152499 A1 | * | 7/2006 | Roberts ......................... 345/173 |
| 2007/0146337 A1 | * | 6/2007 | Ording et al. ................. 345/173 |

FOREIGN PATENT DOCUMENTS

| | | |
|---|---|---|
| JP | 07-319613 | 12/1995 |
| JP | 08-202490 | 8/1996 |
| JP | 3010669 B | 12/1999 |
| JP | 2004-348686 | 12/2004 |
| JP | 2006-285420 | 10/2006 |

* cited by examiner

*Primary Examiner* — Chanh Nguyen
*Assistant Examiner* — Sanghyuk Park
(74) *Attorney, Agent, or Firm* — K&L Gates LLP

(57) ABSTRACT

A touch panel includes a first touch panel substrate; a second touch panel substrate disposed opposite the first touch panel substrate; at least one surface acoustic wave generator that generates a surface acoustic wave propagating across a surface of the second touch panel substrate facing the first touch panel substrate in a predetermined direction; at least one surface acoustic wave sensor that senses the surface acoustic wave generated by the surface acoustic wave generator; a position detector that detects a position where the first touch panel substrate is pressed according to the waveform of the surface acoustic wave sensed by the surface acoustic wave sensor; and spacers disposed between the first and second touch panel substrates along a path where the surface acoustic wave propagates from the surface acoustic wave generator to the surface acoustic wave sensor.

7 Claims, 8 Drawing Sheets

SURFACE ACOUSTIC WAVE TOUCH PANEL, ELECTROOPTICAL DEVICE, AND ELECTRONIC APPARATUS HAVING SPACERS BETWEEN FIRST AND SECOND TOUCH PANEL SUBSTRATES

BACKGROUND

1. Technical Field

The present invention relates to touch panels, electrooptical devices, and electronic apparatuses.

2. Related Art

A surface acoustic wave (SAW) touch panel includes transmitting transducers that transmit surface acoustic waves propagating the panel surface and receiving transducers that receive the surface acoustic waves. An obstacle on the SAW touch panel obstructs and absorbs the surface acoustic waves, which are received by the receiving transducers in a partially attenuated waveform.

The surface acoustic waves are absorbed when a user touches the SAW touch panel surface. The touch panel system measures the time that elapses before an attenuated waveform appears on the waveforms of the surface acoustic waves received by the receiving transducers. Based on the measurements, the touch panel system calculates the X and Y coordinates of a position touched by the user on the panel surface to detect the touched position. SAW touch panels are used as input devices attached on displays for various apparatuses such as word processors and automated teller machines (ATMs). In particular, the use of SAW touch panels as input devices attached on displays for mobile electronic apparatuses such as personal digital assistants (PDAs) and palmtop computers has recently been studied Mobile electronic apparatuses experience frequent vibrations and impacts. Because panel surfaces of SAW touch panels are exposed, they are easily chipped and cracked by vibrations and impacts and undesirably scatter glass shards A known type of SAW touch panel has a protective film on a panel surface to protect the panel surface and prevent scattering of glass shards.

If, for example, the protective film is laminated on the panel surface with an adhesive, the adhesive absorbs the surface acoustic waves. If the protective film is simply placed on the panel surface, a malfunction can occur when they become misaligned. To solve this problem, for example, Japanese Patent No. 3,010,669 discloses an SAW touch panel having spacers between a panel body and a protective film to hold the panel body and the protective film.

In the structure disclosed in this publication, however, the spacers absorb the surface acoustic waves. The attenuation of the surface acoustic wave due to the spacers is difficult to distinguish from attenuation of the surface acoustic wave due to touching. The touch panel system therefore causes misdetection or malfunction and exhibits low position detection performance.

SUMMARY

An advantage of some aspects of the invention is that they provide a touch panel, an electrooptical device, and an electronic apparatus with high position detection performance.

A touch panel according to a first aspect of the invention includes a first touch panel substrate; a second touch panel substrate disposed opposite the first touch panel substrate; at least one surface acoustic wave generator that generates a surface acoustic wave propagating across a surface of the second touch panel substrate facing the first touch panel substrate in a predetermined direction; at least one surface acoustic wave sensor that senses the surface acoustic wave generated by the surface acoustic wave generator; a position detector that detects a position where the first touch panel substrate is pressed according to the waveform of the surface acoustic wave sensed by the surface acoustic wave sensor; and spacers disposed between the first and second touch panel substrates along a path where the surface acoustic wave propagates from the surface acoustic wave generator to the surface acoustic wave sensor.

In the known art, for example, a considerable part of a surface acoustic wave is obstructed by spacers arranged irrespective of the propagation direction of the surface acoustic wave. According to the first aspect of the invention, in contrast, the obstruction of the surface acoustic wave by the spacers can be localized by arranging them along the path where the surface acoustic wave propagates from the surface acoustic wave generator to the surface acoustic wave sensor. This arrangement can minimize attenuation of the surface acoustic wave due to the spacers and thus minimize the dead area of the touch panel to ensure high position detection performance.

A touch panel according to a second aspect of the invention includes a first touch panel substrate; a second touch panel substrate disposed opposite the first touch panel substrate; at least one surface acoustic wave generator that generates a surface acoustic wave propagating across a surface of the second touch panel substrate facing the first touch panel substrate in a predetermined direction; at least one surface acoustic wave sensor that senses the surface acoustic wave generated by the surface acoustic wave generator; a position detector that detects a position where the first touch panel substrate is pressed according to the waveform of the surface acoustic wave sensed by the surface acoustic wave sensor; and spacers disposed between the first and second touch panel substrates in a region where the surface acoustic wave generated by the surface acoustic wave generator does not propagate on the surface of the second touch panel substrate facing the first touch panel substrate.

If, for example, a region where the surface acoustic wave propagates is defined in the center of the first or second touch panel substrate, a region other than the propagation region (for example, a peripheral region surrounding the propagation region) corresponds to the region where the surface acoustic wave does not propagate. According to the second aspect of the invention, the surface acoustic wave is not absorbed by the spacers because they are disposed in the region where the surface acoustic wave does not propagate. This arrangement can minimize the dead area of the touch panel to ensure high position detection performance.

Preferably, the spacers are columnar spacers.

In this case, the top and bottom surfaces of the columnar spacers come in surface contact with the first and second touch panel substrates, respectively. The columnar spacers can therefore stably hold the first and second touch panel substrates.

The spacers may also be spherical spacers.

In this case, the spacers come in point contact with the first and second touch panel substrates. This reduces the attenuation of the surface acoustic wave.

Preferably, an adhesive is applied to portions of the spacers in contact with the first touch panel substrate and/or portions of the spacers in contact with the second touch panel substrate.

In this case, the adhesive can stably hold the first and second touch panel substrates.

Preferably, the portions of the spacers in contact with the first and second touch panel substrates are narrower than the width of the minimum detection resolution of the position detector.

If, for example, the position detector detects a position according to coordinates defined on the first touch panel substrate, the length of the minimum unit of the coordinates corresponds to the width of the minimum detection resolution.

In this case, attenuation of the surface acoustic wave due to touching, for example, can be readily distinguished from the attenuation of the surface acoustic wave due to the spacers because the duration of the attenuation due to the spacers is shorter than the duration of the attenuation due to touching. This prevents confusion between the attenuation due to the spacers and the attenuation due to touching.

An electrooptical device includes the touch panel described above and a display panel disposed opposite the touch panel and having a display surface where an image is displayed. The touch panel included in the electrooptical device provides high position detection performance.

Preferably, the first touch panel substrate is formed of a resin film.

In this case, the first touch panel substrate can prevent scattering of shards if the second touch panel substrate is broken.

In addition, the resin film can absorb the surface acoustic wave sufficiently to ensure high position detection performance even for writing or touching with a hard material (such as a nail or a pen) that absorbs little surface acoustic wave.

Preferably, the first touch panel substrate is a polarizer.

In this case, the first touch panel substrate can prevent scattering of shards if the second touch panel substrate is broken. In addition, the first touch panel substrate functions as a polarizer for the electrooptical device to eliminate the need to use an additional polarizer. This allows for a reduction in the thickness of the electrooptical device.

preferably, the electrooptical device further includes a resin film disposed on a surface of the first touch panel substrate facing the second touch panel substrate.

The resin film can absorb the surface acoustic wave sufficiently to ensure high position detection performance even for writing or touching with a hard material (such as a nail or a pen) that absorbs little surface acoustic wave.

An electrooptical device according to a third aspect of the invention includes a first touch panel substrate; a second touch panel substrate disposed opposite the first touch panel substrate; a display panel disposed opposite a surface of the second touch panel substrate facing away from the first touch panel substrate with a predetermined gap defined therebetween; at least one surface acoustic wave generator that generates a surface acoustic wave propagating across the surface of the second touch panel substrate facing away from the first touch panel substrate in a predetermined direction; at least one surface acoustic wave sensor that senses the surface acoustic wave generated by the surface acoustic wave generator; a position detector that detects a position where the first touch panel substrate is pressed according to the waveform of the surface acoustic wave sensed by the surface acoustic wave sensor; and spacers disposed between the second touch panel substrate and the display panel along a path where the surface acoustic wave propagates from the surface acoustic wave generator to the surface acoustic wave sensor.

According to the third aspect of the invention, the surface acoustic wave is not absorbed by the spacers because they are disposed along the path where the surface acoustic wave propagates from the surface acoustic wave generator to the surface acoustic wave sensor. This arrangement can minimize the dead area of the touch panel to ensure high position detection performance. In addition, the electrooptical device includes the first touch panel substrate, the second touch panel substrate disposed opposite the first touch panel substrate, and the display panel disposed opposite the surface of the second touch panel substrate facing away from the first touch panel substrate with the predetermined gap defined therebetween. If the second touch panel substrate is broken, the first touch panel substrate can cover the broken substrate to prevent scattering of shards.

An electrooptical device according to a fourth aspect of the invention includes a first touch panel substrate; a second touch panel substrate disposed opposite the first touch panel substrate; a display panel disposed opposite a surface of the second touch panel substrate facing away from the first touch panel substrate with a predetermined gap defined therebetween; at least one surface acoustic wave generator that generates a surface acoustic wave propagating across the surface of the second touch panel substrate facing away from the first touch panel substrate in a predetermined direction; at least one surface acoustic wave sensor that senses the surface acoustic wave generated by the surface acoustic wave generator; a position detector that detects a position where the first touch panel substrate is pressed according to the waveform of the surface acoustic wave sensed by the surface acoustic wave sensor; and spacers disposed between the second touch panel substrate and the display panel in a region where the surface acoustic wave generated by the surface acoustic wave generator does not propagate on the surface of the second touch panel substrate facing away from the first touch panel substrate.

According to the fourth aspect of the invention, the surface acoustic wave is not absorbed by the spacers because they are disposed in the region where the surface acoustic wave does not propagate. This arrangement can minimize the dead area of the touch panel to ensure high position detection performance. In addition, the electrooptical device includes the first touch panel substrate, the second touch panel substrate disposed opposite the first touch panel substrate, and the display panel disposed opposite the surface of the second touch panel substrate facing away from the first touch panel substrate with the predetermined gap defined therebetween. If the second touch panel substrate is broken, the first touch panel substrate can cover the broken substrate to prevent scattering of shards.

Preferably, an adhesive is applied to portions of the spacers in contact with the second touch panel substrate and/or portions of the spacers in contact with the display panel.

In this case, the adhesive can stably hold the second touch panel substrate and the display panel.

Preferably, the portions of the spacers in contact with the second touch panel substrate and the display panel are narrower than the width of the minimum detection resolution of the position detector.

In this case, attenuation of the surface acoustic wave due to touching, for example, can be readily distinguished from the attenuation of the surface acoustic wave due to the spacers because the duration of the attenuation due to the spacers is shorter than the duration of the attenuation due to touching. This prevents confusion between the attenuation due to the spacers and the attenuation due to touching.

Preferably, the first touch panel substrate is a polarizer.

In this case, the first touch panel substrate can prevent scattering of shards if the second touch panel substrate is broken. In addition, the first touch panel substrate functions as a polarizer for the electrooptical device to eliminate the need to use an additional polarizer. This allows for a reduction in the thickness of the electrooptical device.

Preferably, the electrooptical device further includes a resin film disposed on a surface of the display panel facing the second touch panel substrate.

The resin film can absorb the surface acoustic wave sufficiently to ensure high position detection performance even for writing or touching with a hard material (such as a nail or a pen) that absorbs little surface acoustic wave.

Preferably, the resin film has a birefringence phase difference of substantially zero.

In this case, loss of light due to the resin film can be inhibited to enhance light availability. The electrooptical device can therefore achieve high brightness and contrast.

Preferably, the direction of the polarization axis of the polarizer substantially agrees with the direction of the slow or fast axis of the resin film.

In this case, loss of light due to the polarizer and the resin film can be inhibited to enhance light availability. The electrooptical device can therefore achieve high brightness and contrast.

Preferably, the birefringence phase difference of the resin film and the directions of the slow and fast axes thereof are selected so as to compensate for the birefringence phase difference of the display panel.

In this case, loss of light due to the birefringence phase difference can be inhibited to enhance light availability. The electrooptical device can therefore achieve high brightness and contrast.

An electronic apparatus includes the electrooptical device described above, which provides high position detection performance.

BRIEF DESCRIPTION OF THE DRAWINGS

The invention will be described with reference to the accompanying drawings, wherein like numbers reference like elements.

DESCRIPTION OF EXEMPLARY EMBODIMENTS

Embodiments of the invention will now be described with reference to the drawings, where individual members are illustrated on different scales so that they have visible sizes.

First Embodiment

Figure 1:
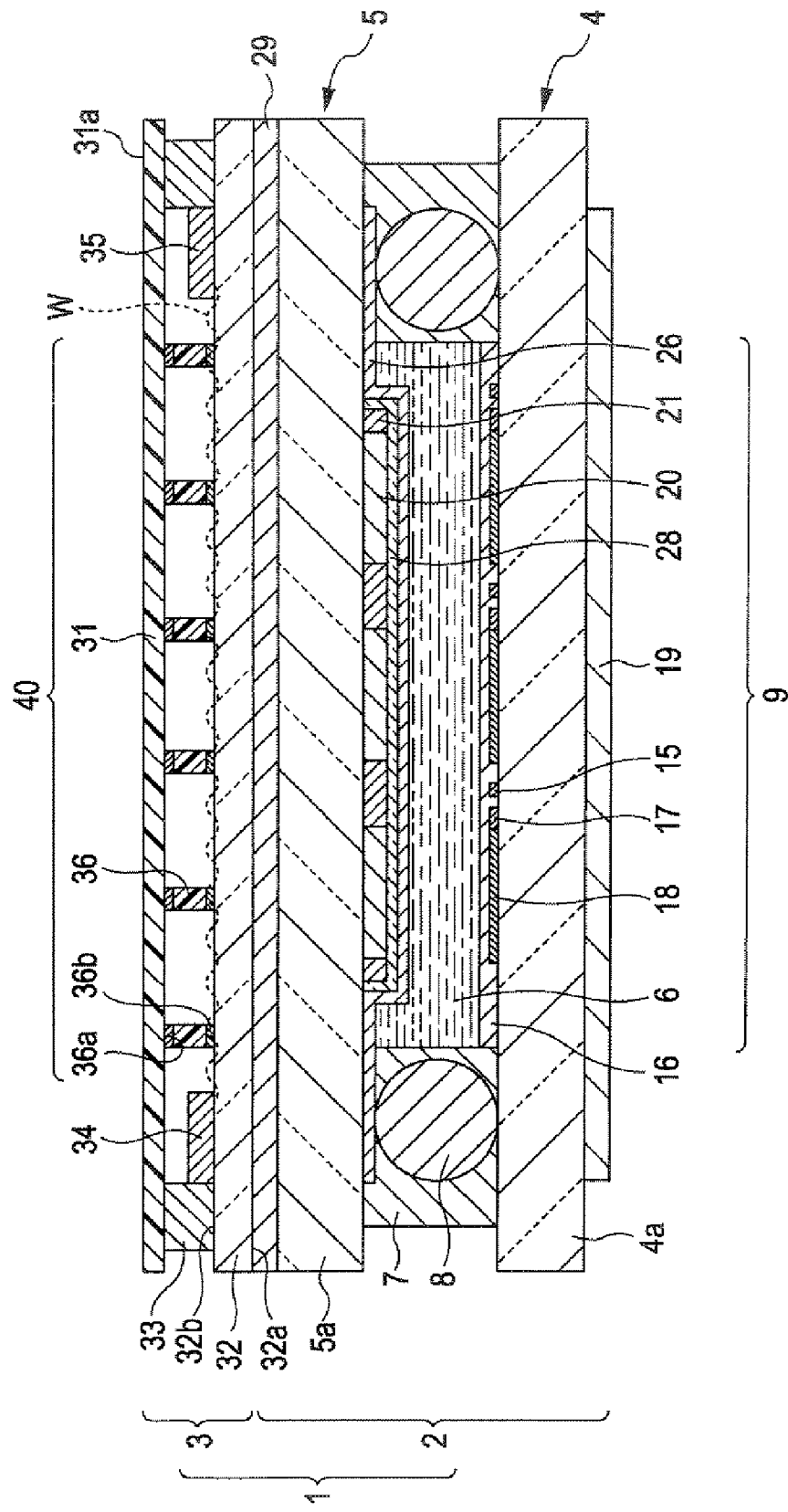
FIG. 1 is a sectional view of a liquid crystal device according to a first embodiment of the invention.

A touch-panel-equipped liquid crystal device according to a first embodiment of the invention will be described. FIG. 1 is a sectional view of a touch-panel-equipped liquid crystal device 1.

In FIG. 1, the liquid crystal device 1 mainly includes a liquid crystal panel 2 and a touch panel 3 bonded thereto. The liquid crystal device 1 according to this embodiment is of active matrix type, including thin-film transistors (TFTs) as switching elements for driving the liquid crystal device 1. The touch panel 3 includes chevron-shaped transducers.

First, the liquid crystal panel 2 will be described. This liquid crystal panel 2 includes a TFT array substrate 4, a color filter substrate 5 bonded thereto with a seal 7, and a liquid crystal layer 6 sealed within a region defined by the seal 7. A gap member 8 is provided in the seal 7 to define a gap between the TFT array substrate 4 and the color filter substrate 5. The region defined by the seal 7 functions as a display region 9 where images or videos are displayed.

The TFT array substrate 4 mainly includes a base 4a formed of a highly transparent material such as glass or quartz. The TFT array substrate 4 also has pixel electrodes 18, TFTs 17 for driving the pixel electrodes 18, data lines (not shown) and scanning lines 15 for transmitting electrical signals to the TFTs 17, and an alignment film 16 covering the pixel electrodes 18, the TFTs 17, the data lines, and the scanning lines 15 on the liquid crystal layer 6 side of the base 4a. The pixel electrodes 18 are formed of a transparent conductive material such as indium tin oxide (ITO). A polarizer 19 is bonded to an outer surface of the TFT array substrate 4 (facing away from the liquid crystal layer 6).

Similarly, the color filter substrate 5 mainly includes a base 5a formed of a highly transparent material such as glass or quartz. The color filter substrate 5 also has a color filter layer 20, a black matrix 21 surrounding the color filter layer 20, a common electrode 28 covering the color filter layer 20 and the black matrix 21, and an alignment film 26 covering the common electrode 21 on the liquid crystal layer 6 side of the base 5a. For example, the color filter layer 20 includes three color layers, namely, a red color layer, a green color layer, and a blue color layer. The common electrode 21 is formed of a transparent conductive material such as ITO. A polarizer 29 is bonded to an outer surface of the color filter substrate 5.

The liquid crystal layer 6 is composed of molecules of a liquid crystal compound such as a fluorine-containing liquid crystal compound or a fluorine-free liquid crystal compound. The liquid crystal layer 6 is held between the alignment film 16 of the TFT array substrate 4 and the alignment film 26 of the color filter substrate 5. The alignment films 16 and 26 align the liquid crystal molecules so that they are oriented in a predetermined direction when a nonselective voltage is applied thereto.

Although not illustrated in this embodiment, a backlight is disposed on the TFT array substrate 4 side. The backlight emits light passing through the TFT array substrate 4, the liquid crystal layer 6, and the color filter substrate 5 to display images (including characters and videos) on the color filter substrate 5 side. That is, the color filter substrate 5 side is the display side in this embodiment.

Next, the touch panel 3 will be described. The touch panel 3 is of SAW type, including a first touch panel substrate 31 and a second touch panel substrate 32 bonded thereto with a seal 33. The touch panel 3 is bonded to the liquid crystal panel 2 on the display side (the color filter substrate 5 side) thereof so as to face a display surface of the liquid crystal panel 2.

The first touch panel substrate 31 is touched by a user directly or using, for example, a pen, and has such flexibility that the substrate 31 is bent by touching. The first touch panel substrate 31 is formed of, for example, a highly transparent resin film. In inputting, the user touches an input region 40 defined in substantially the center of an outer surface 31a of the first touch panel substrate 31.

The second touch panel substrate 32 is formed of a highly transparent material such as glass or quartz and is disposed opposite the first touch panel substrate 31. An outer surface 32a of the second touch panel substrate 32 is bonded to the polarizer 29 disposed on the display side of the liquid crystal panel 2.

Transmitting transducers 34 and receiving transducers 35 are disposed on an inner surface 32b of the second touch panel substrate 32 (facing the first touch panel substrate 31). The transmitting transducers 34 generate surface acoustic waves propagating across the inner surface 32b of the second touch panel substrate 32, and the receiving transducers 35 sense the surface acoustic waves. The transmitting transducers 34 and the receiving transducers 35 are connected to a control circuit (not shown) including, for example, a surface acoustic wave controller and a position detector. The surface acoustic wave controller controls the magnitude and wavelength of the surface acoustic waves generated by the transmitting transducers 34. The position detector detects a position touched by the user according to the waveforms of the surface acoustic waves sensed by the receiving transducers 35. During the operation of the liquid crystal device 1, the surface acoustic wave controller outputs a rectangular or sinusoidal wave in a burst waveform every predetermined period, and the transmitting transducers 34 transmit a surface acoustic wave W according to the burst waveform.

Columnar spacers 36 are disposed between the first touch panel substrate 31 and the second touch panel substrate 32. The columnar spacers 36 have a cylindrical shape and are formed of, for example, resin. The columnar spacers 36 maintain a uniform gap between the first touch panel substrate 31 and the second touch panel substrate 32. An adhesive is applied to the top surfaces 36a and bottom surfaces 36b of the columnar spacers 36 to prevent misalignment of the touch panel substrates 31 and 32.

Figure 2:
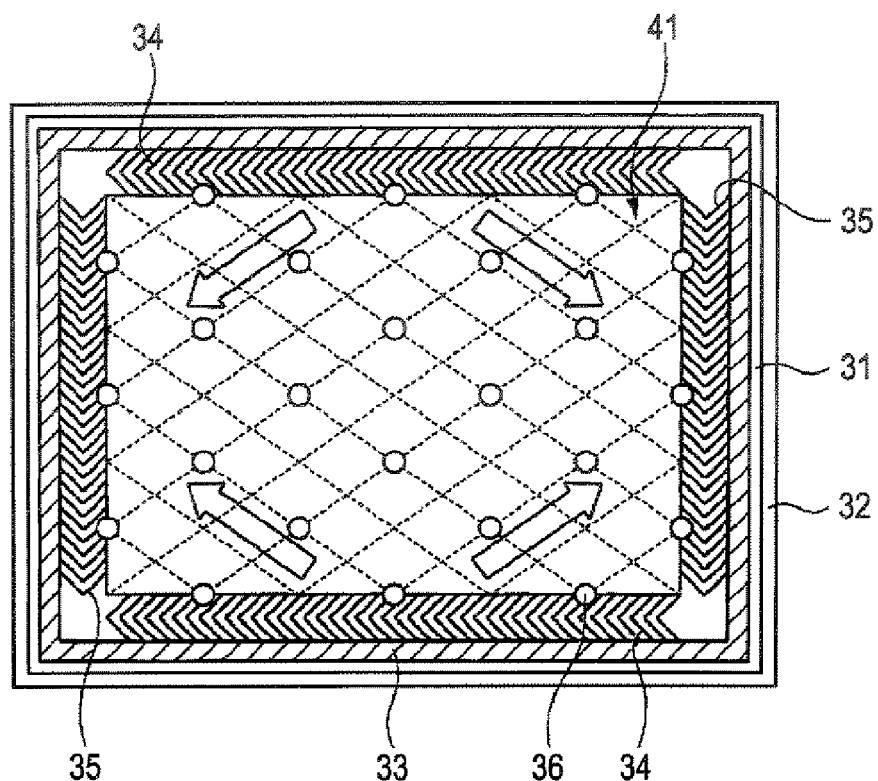
FIG. 2 is a plan view of the liquid crystal device according to this embodiment.

FIG. 2 is a plan view of the touch panel 3 from the first touch panel substrate 31 side, showing the inner surface 32b of the second touch panel substrate 32. The first touch panel substrate 31 is not illustrated in FIG. 2.

In FIG. 2, the transmitting transducers 34 are arranged at predetermined intervals along the upper and lower sides of the second touch panel substrate 32, and the receiving transducers 35 are arranged at predetermined intervals along the left and right sides of the second touch panel substrate 32. The transmitting transducers 34 and the receiving transducers 35 are arranged so as to surround a region 41 overlapping substantially the center of the second touch panel substrate 32, that is, the input region 40 (see FIG. 1). Surface acoustic waves propagate across the region 41, which is hereinafter referred to as "propagation region 41". Each of the transmitting transducers 34 generates a surface acoustic wave propagating across the propagation region 41 toward the receiving transducers 35 in directions indicated by the empty arrows shown in FIG. 2. The receiving transducers 35 are disposed on the left and right sides of the second touch panel substrate 32, that is, on the sides adjacent to the sides along which the transmitting transducers 34 are arranged.

In FIG. 2, for example, the columnar spacers 36 of the first row (the uppermost row in FIG. 2) are arranged along the upper side of the propagation region 41. One of the columnar spacers 36 is disposed in the center of the upper side of the propagation region 41 in the longitudinal direction, and the other columnar spacers 36 are arranged at regular intervals with respect to the central columnar spacer 36 in the longitudinal direction. The columnar spacers 36 of the lowermost row are similarly arranged.

The columnar spacers 36 of the first column (the leftmost column in FIG. 2) are arranged along the left side of the propagation region 41. One of the columnar spacers 36 is disposed in the center of the left side of the propagation region 41 in the lateral direction, and the other columnar spacers 36 are arranged at regular intervals with respect to the central columnar spacer 36 in the lateral direction. The columnar spacers 36 of the rightmost column are similarly arranged.

The columnar spacers 36 of the second and subsequent rows are shifted from each other by half the pitch of the columnar spacers 36 in the longitudinal direction The columnar spacers 36 of the second and subsequent columns are shifted from each other by half the pitch of the columnar spacers 36 in the lateral direction. Thus, the columnar spacers 36 are arranged in the propagation region 41 symmetrically both in the longitudinal direction and in the lateral direction.

The pitch of the columnar spacers 36 is determined so that they are arranged at regular intervals on straight lines extending in the propagation direction of surface acoustic waves (indicated by the broken lines in FIG. 2). The columnar spacers 36 are thus arranged in the propagation region 41 in the propagation direction of surface acoustic waves. Although the columnar spacers 36 are not disposed on some of the broken lines in FIG. 2, the spacers 36 may also be disposed on those broken lines or at the intersection points thereof. In addition, some of the columnar spacers 36 arranged as shown in FIG. 2 may be removed.

Figure 3:
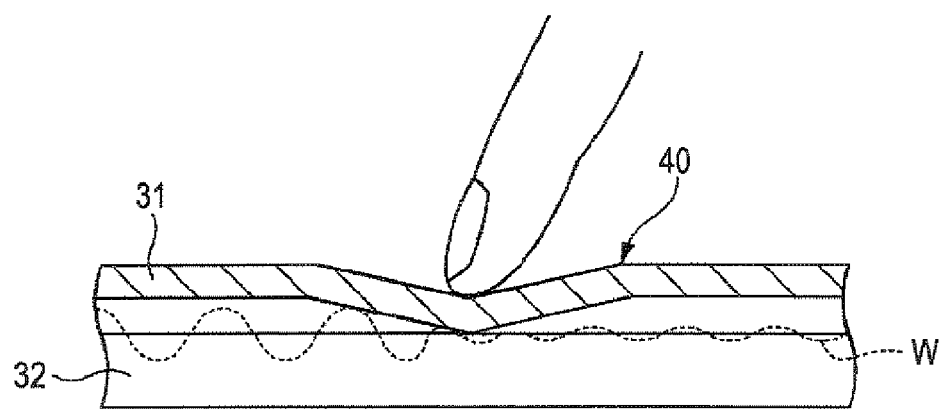
FIG. 3 is a schematic diagram of a touch panel touched by a user.
Figure 4:
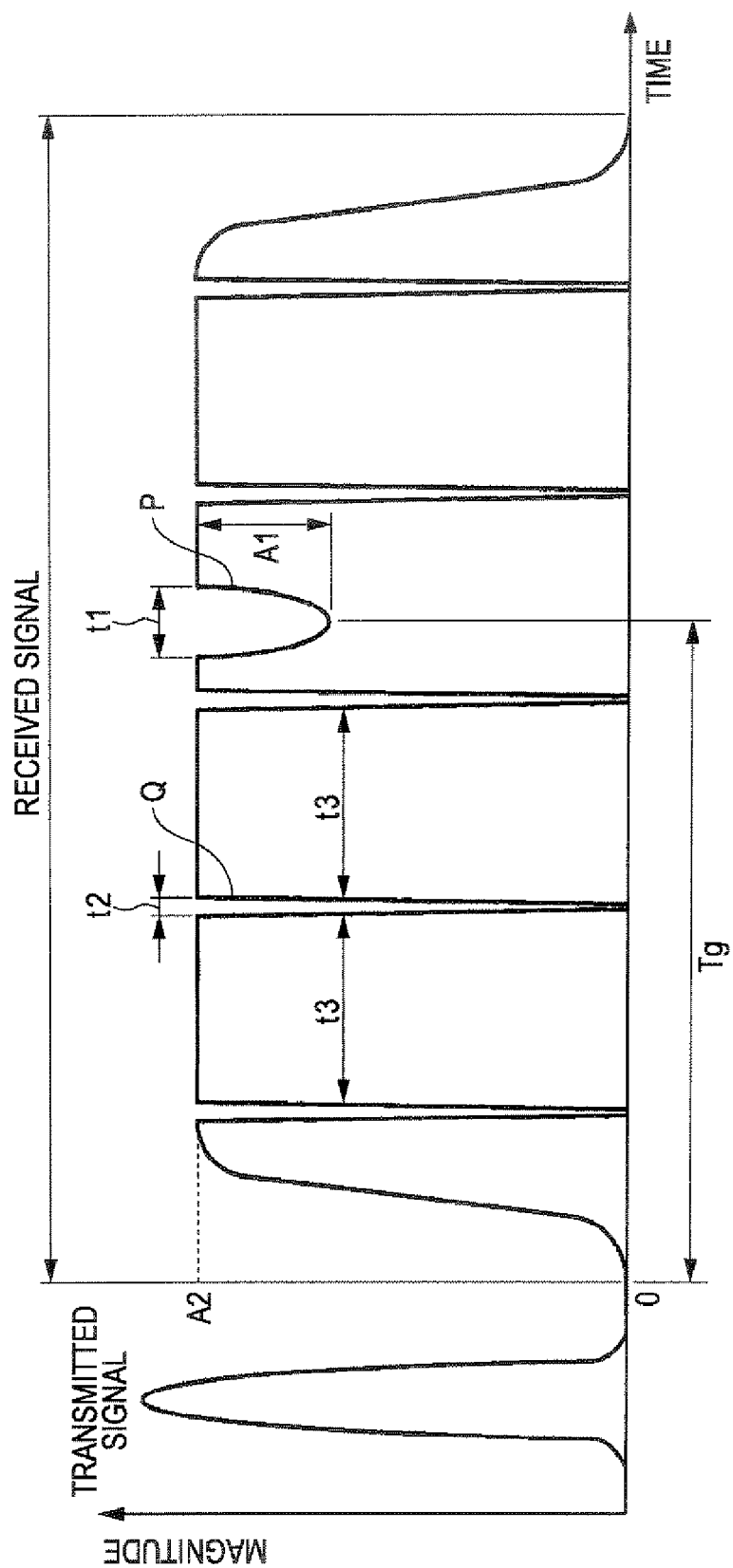
FIG. 4 is a graph showing the waveform of a surface acoustic wave detected by a receiving transducer.

The operation of the touch panel 3 after being touched by the user will be described with reference to FIGS. 3 and 4, FIG. 3 is a schematic diagram showing a user's finger touching the touch panel 3. FIG. 4 is a graph showing an example of an envelope waveform of a surface acoustic wave sensed by the receiving transducers 35, where the horizontal axis indicates time and the vertical axis indicates the magnitude of surface acoustic waves When the user touches the input region 40 by finger as shown in FIG. 3, the first touch panel substrate 31 is bent toward the second touch panel substrate 32 and comes into contact therewith at a touched position. The first touch panel substrate 31 absorbs the surface acoustic wave W propagating across the surface of the second touch panel substrate 32 when the surface acoustic wave W passes through a portion of the second touch panel substrate 32 in contact with the first touch panel substrate 31. The surface acoustic wave W is thus attenuated to about half the initial magnitude.

When the user touches the first touch panel substrate 31, as shown in FIG. 4, a missing portion (attenuated portion P) having a magnitude of A1 and a duration of t1 occurs in the envelope waveform of the surface acoustic wave W. The control circuit described above measures the time Tg from the sensing of the surface acoustic wave W by the receiving transducers 35 until the attenuated portion P occurs According to the time Tg, the control circuit calculates the position where the surface acoustic wave W is attenuated on the first touch panel substrate 31 to identify the coordinates of the touched position.

In addition, attenuated portions Q having a magnitude of zero and a duration of t2 occur regularly in the envelope waveform shown in FIG. 4 when the surface acoustic wave W propagates through the columnar spacers 36 arranged on the same broken line of FIG. 2. The attenuated portions Q appear periodically because the columnar spacers 36 are arranged at regular intervals on straight lines extending in the propagation direction of the surface acoustic wave W.

The portions Q attenuated by the columnar spacers 36 appear periodically and have a shorter duration and a larger attenuation in magnitude (A2) than the portion P attenuated by touching. Hence, the attenuated portion P can be readily identified by, for example, programming the control circuit with the properties of the attenuated portions Q.

According to this embodiment, as described above, the first touch panel substrate 31 is bonded to the second touch panel substrate 32 with the seal 33, If the second touch panel substrate 32 is broken, the first touch panel substrate 31 can cover the broken substrate 32 to prevent scattering of shards In writing or touching, the first touch panel substrate 31, which is formed of a resin film, comes into contact with the second touch panel substrate 32. The first touch panel substrate 31 sufficiently absorbs the surface acoustic wave W propagating across the surface of the second touch panel substrate 32 when the surface acoustic wave W passes through a portion of the second touch panel substrate 32 in contact with the first touch panel substrate 31. The first touch panel substrate 31 can therefore ensure high position detection performance even for writing or touching with a hard material (such as a nail or a pen).

In addition, the obstruction of the surface acoustic wave W by the columnar spacers 36 can be localized by arranging them in the propagation direction of the surface acoustic wave W. This arrangement can minimize the attenuation of the surface acoustic wave W due to the columnar spacers 36 and thus minimize the dead area of the first touch panel substrate 31 to ensure high position detection performance.

In addition, the attenuation of the surface acoustic wave W due to touching can be readily distinguished from the attenuation of the surface acoustic wave W due to the columnar spacers 36 because the duration (t2) of the attenuation due to the columnar spacers 36 is shorter than the duration (t1) of the attenuation due to touching. This prevents confusion between the attenuation due to the columnar spacers 36 and the attenuation due to touching to ensure higher position detection performance.

Second Embodiment

A second embodiment of the invention will be described. In the drawings, as in the first embodiment, individual members are illustrated on different scales so that they have visible sizes. No description will be given of the same components as used in the first embodiment.

Figure 5:
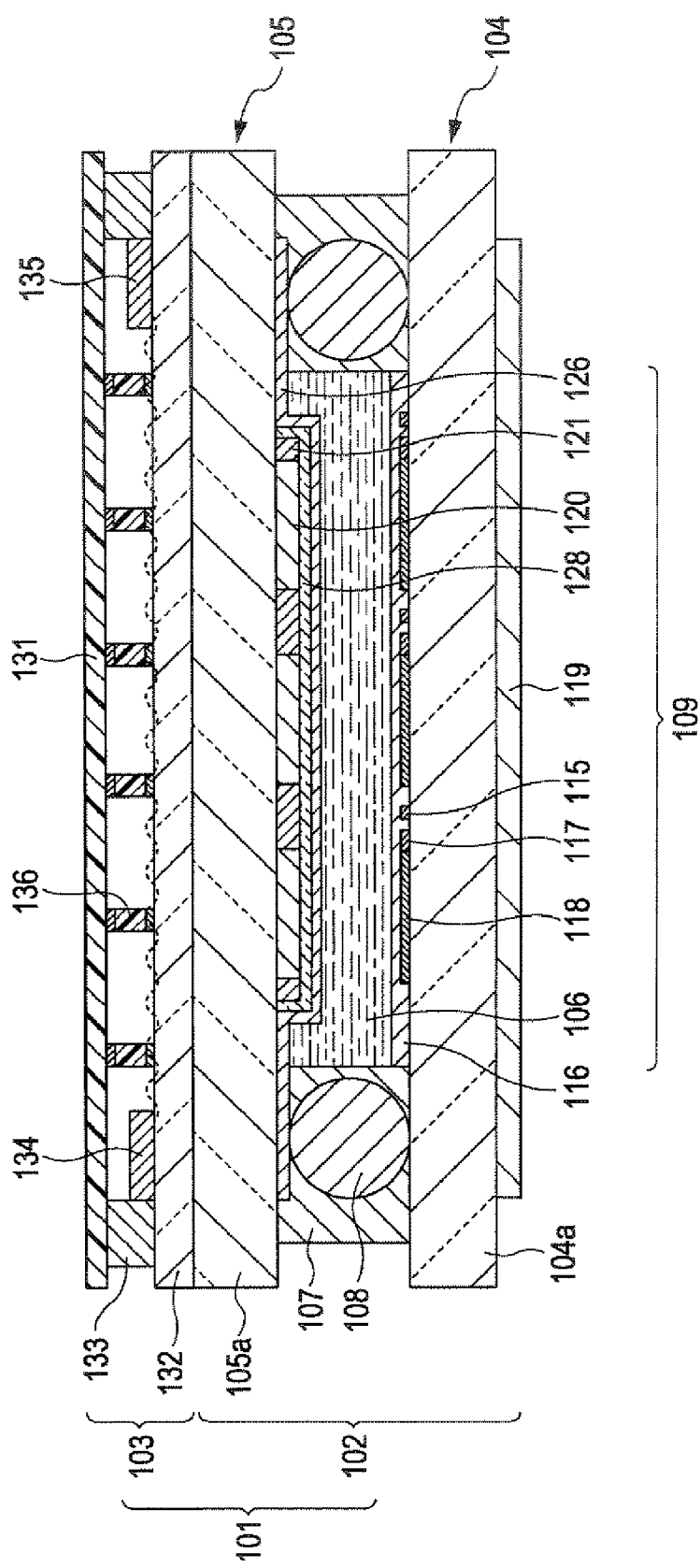
FIG. 5 is a sectional view of a liquid crystal device according to a second embodiment of the invention.

FIG. 5 is a sectional view of a touch-panel equipped liquid crystal device 101 according to this embodiment.

In FIG. 5, the liquid crystal device 101 mainly includes a liquid crystal panel 102 and a touch panel 103 bonded thereto, as in the first embodiment.

In this embodiment, a first touch panel substrate 131 of the touch panel 103 functions as a polarizer for the liquid crystal panel 102. Accordingly, a second touch panel substrate 132 of the touch panel 103 is directly bonded to a color filter substrate 105 of the liquid crystal panel 102 with no polarizer disposed therebetween. The rest of the structure of the liquid crystal device 101 is the same as in the first embodiment According to this embodiment, the first touch panel substrate 131 is bonded to the second touch panel substrate 132 with a seal 133. If the second touch panel substrate 132 is broken, the first touch panel substrate 131 can cover the broken substrate 132 to prevent scattering of shards.

In addition, no polarizer is required between the liquid crystal panel 102 and the touch panel 103 because the first touch panel substrate 131 of the touch panel 103 functions as a polarizer for the liquid crystal panel 102. This allows for a reduction in the thickness of the liquid crystal device 101.

Third Embodiment

A third embodiment of the invention will be described. In the drawings, as in the first embodiment, individual members are illustrated on different scales so that they have visible sizes. No description will be given of the same components as used in the first embodiment.

Figure 6:
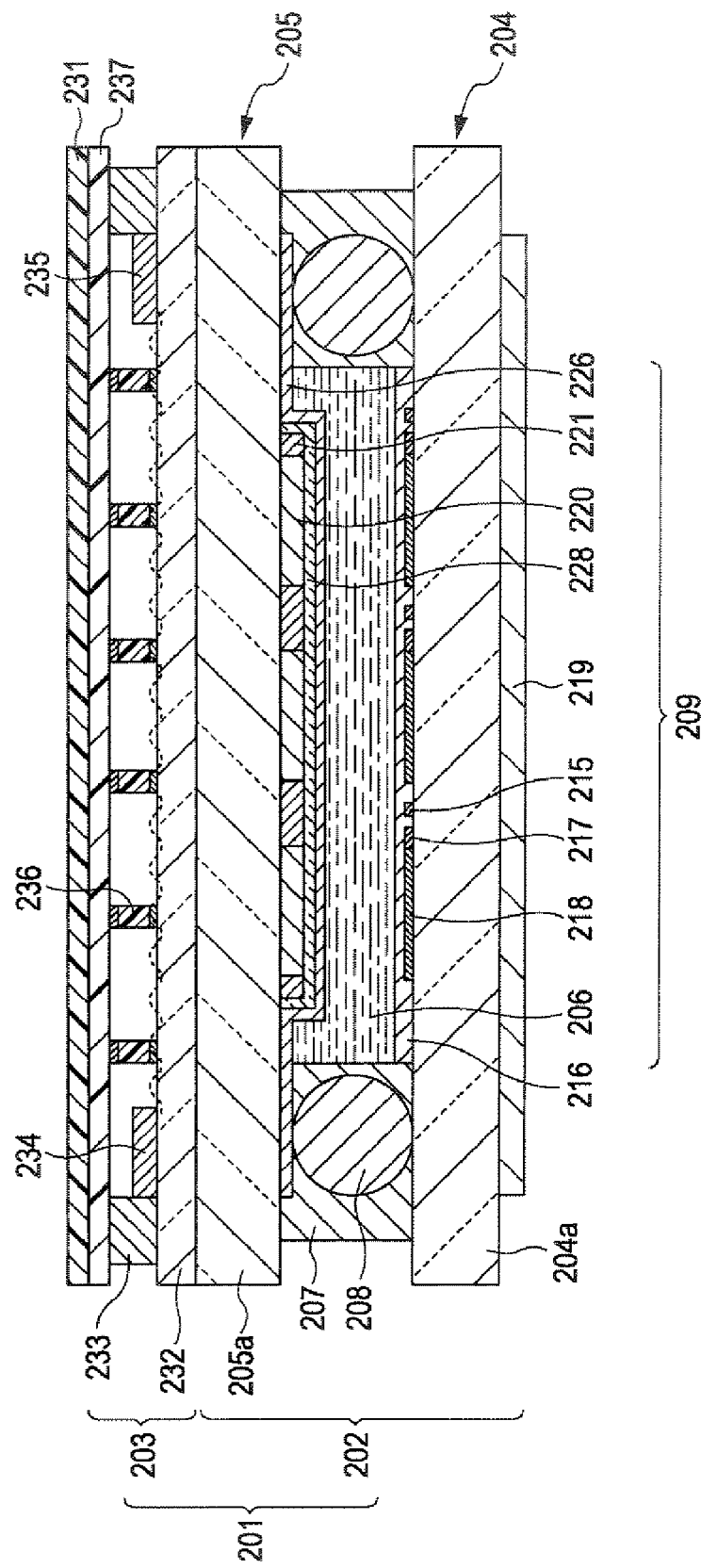
FIG. 6 is a sectional view of a liquid crystal device according to a third embodiment of the invention.

FIG. 6 is a sectional view of a touch-panel-equipped liquid crystal device 201 according to this embodiment.

In FIG. 6, the liquid crystal device 201 mainly includes a liquid crystal panel 202 and a touch panel 203 bonded thereto, as in the first embodiment.

In this embodiment, a resin film 237 is bonded to an inner surface of a first touch panel substrate 231 of the touch panel 203 (facing the liquid crystal panel 202).

As in the second embodiment, additionally, the first touch panel substrate 131 functions as a polarizer for the liquid crystal panel 202. Accordingly, a second touch panel substrate 232 of the touch panel 203 is directly bonded to a color filter substrate 205 of the liquid crystal panel 202 with no polarizer disposed therebetween. The direction of the polarization axis of a polarizer 219 substantially agrees with the direction of the slow axis of the resin film 237 while the direction of the polarization axis of the first touch panel substrate 231 substantially agrees with the direction of the fast axis of the resin film 237. The rest of the structure of the liquid crystal device 201 is the same as in the first embodiment.

According to this embodiment, the first touch panel substrate 231 is bonded to the second touch panel substrate 232 with a seal 233. If the second touch panel substrate 232 is broken, the first touch panel substrate 231 can cover the broken substrate 232 to prevent scattering of shards.

Although the first touch panel substrate 231 and the resin film 237 are illustrated as having similar thicknesses in FIG. 6, the thickness of the resin film 237 can be sufficiently reduced relative to that of the first touch panel substrate 231 because the resin film 237 suffers no damage from writing or touching. This allows for a reduction in the thickness of the liquid crystal device 201.

In writing or touching, the resin film 237 comes into contact with the second touch panel substrate 232. The resin film 237 sufficiently absorbs the surface acoustic wave W propagating across the surface of the second touch panel substrate 232 when the surface acoustic wave W passes through a portion of the second touch panel substrate 232 in contact with the resin film 237. The resin film 237 can therefore ensure high position detection performance even for writing or touching with a hard material (such as a nail or a pen).

In addition, the direction of the polarization axis of the polarizer 219 substantially agrees with the direction of the slow axis of the resin film 237 while the direction of the polarization axis of the first touch panel substrate 231 substantially agrees with the direction of the fast axis of the resin film 237. This prevents light from being blocked by the polarizer 219, the first touch panel substrate 231, or the resin film 237. The liquid crystal device 201 can therefore achieve high contrast.

Fourth Embodiment

A fourth embodiment of the invention will be described In the drawings; as in the first embodiment, individual members are illustrated on different scales so that they have visible sizes. No description will be given of the same components as used in the first embodiment.

Figure 7:
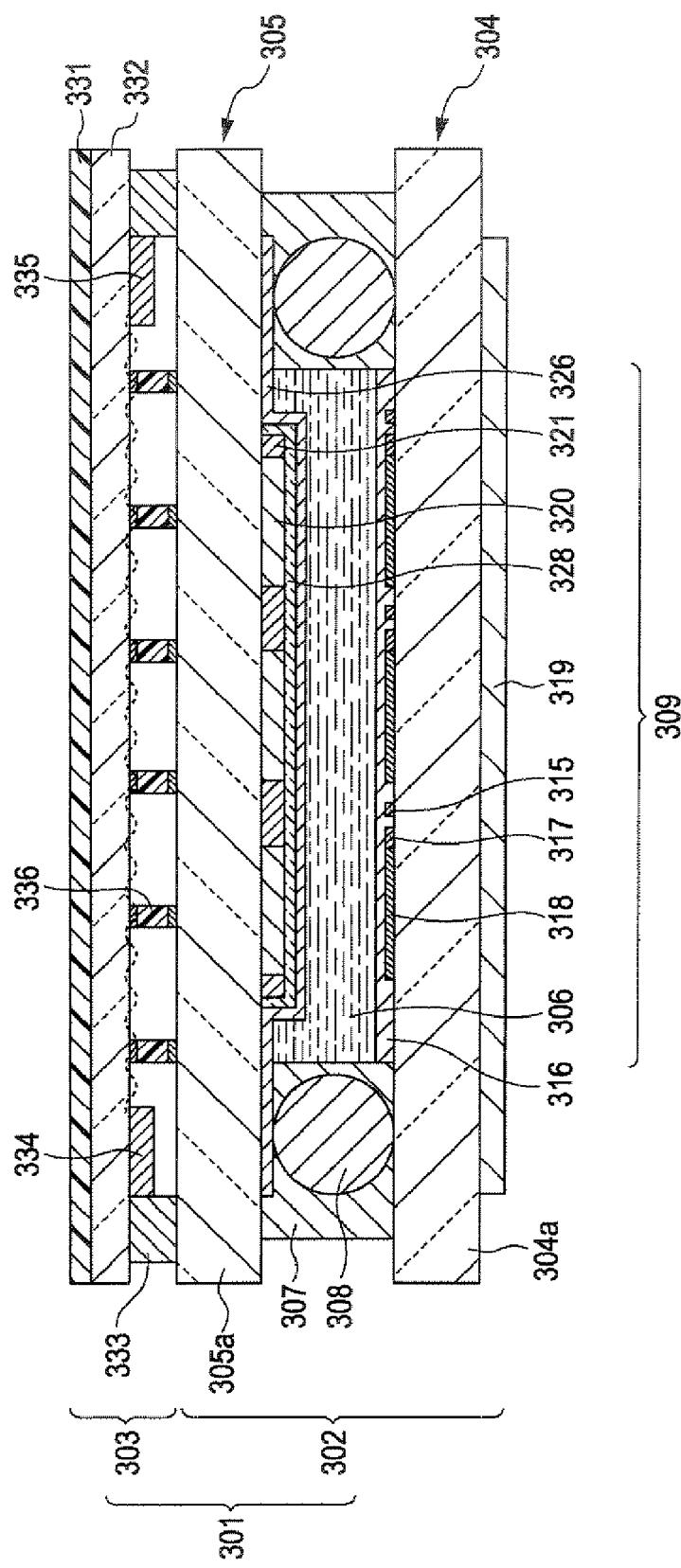
FIG. 7 is a sectional view of a liquid crystal device according to a fourth embodiment of the invention.

FIG. 7 is a sectional view of a touch-panel-equipped liquid crystal device 301 according to this embodiment In FIG. 7, the liquid crystal device 301 mainly includes a liquid crystal panel 302 and a touch panel 303 bonded thereto, as in the first embodiment In this embodiment, a seal 333 and columnar spacers 336 define a uniform gap between the touch panel 303 and the liquid crystal panel 302.

In this embodiment, a first touch panel substrate 331 is bonded to an outer surface of a second touch panel substrate 332 (facing away from the liquid crystal panel 302). The first touch panel substrate 331 functions as a polarizer for the liquid crystal panel 302. Transmitting transducers 334 and receiving transducers 335 are disposed on an inner surface of the second touch panel substrate 332 (facing the liquid crystal panel 302) so that surface acoustic waves propagate across the inner surface of the second touch panel substrate 332. The rest of the structure of the liquid crystal device 301 is the same as in the first embodiment.

According to this embodiment, as described above, the first touch panel substrate 331 is bonded to the outer surface of the second touch panel substrate 332. If the second touch panel substrate 332 is broken, the first touch panel substrate 331 can cover the broken substrate 332 to prevent scattering of shards.

In addition, no polarizer is required between the liquid crystal panel 302 and the touch panel 303 because the first touch panel substrate 331 of the touch panel 303 functions as a polarizer for the liquid crystal panel 302. This allows for a reduction in the thickness of the liquid crystal device 301.

In addition, the first touch panel substrate 331, which is a polarizer, can achieve significantly increased resistance to writing because the first touch panel substrate 331 is directly bonded to the outer surface of the second touch panel substrate 332, which is formed of, for example, glass or quartz.

Fifth Embodiment

A fifth embodiment of the invention will be described. In the drawings, as in the first embodiment, individual members are illustrated on different scales so that they have visible sizes. No description will be given of the same components as used in the first embodiment.

Figure 8:
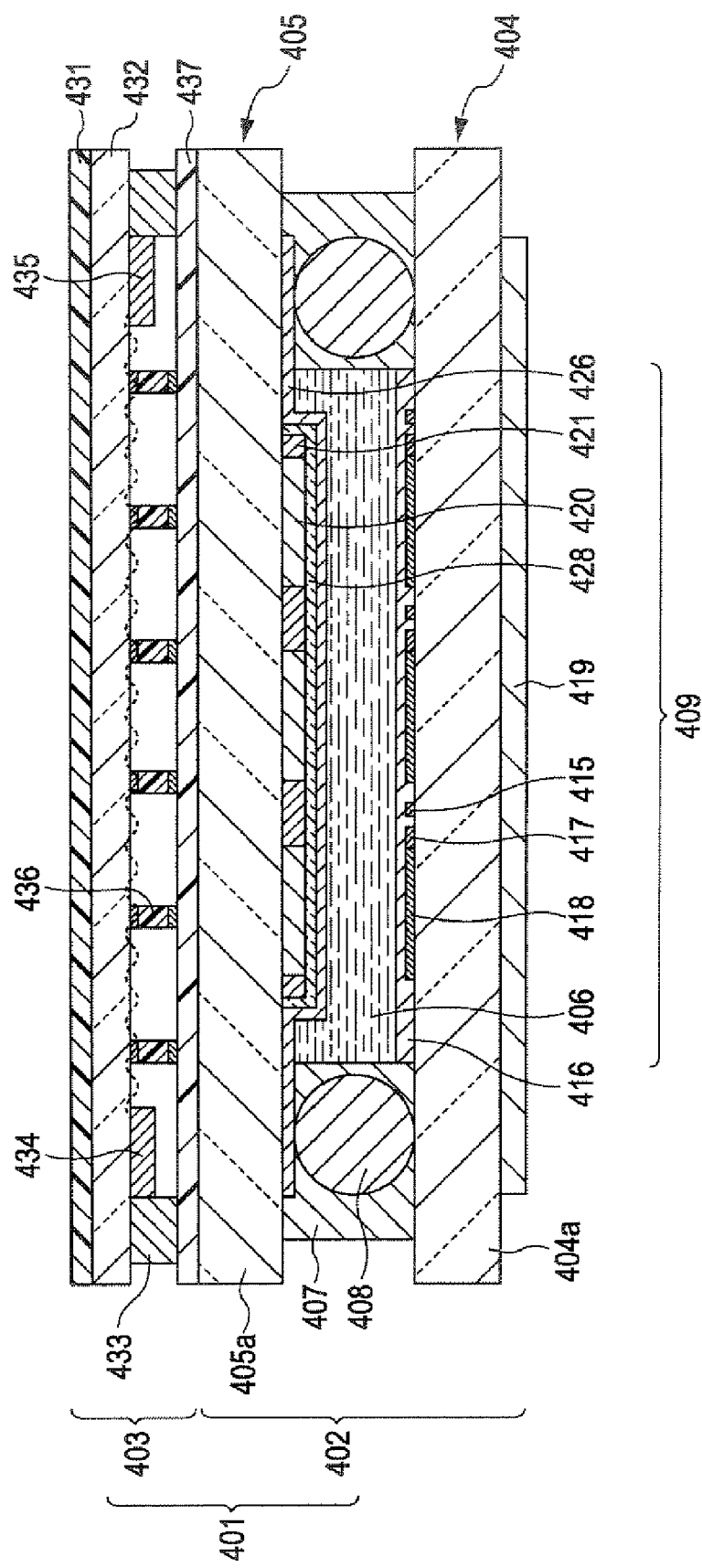
FIG. 8 is a sectional view of a liquid crystal device according to a fifth embodiment of the invention.

FIG. 8 is a sectional view of a touch-panel-equipped liquid crystal device 401 according to this embodiment.

In FIG. 8, the liquid crystal device 401 mainly includes a liquid crystal panel 402 and a touch panel 403 bonded thereto, as in the first embodiment.

In this embodiment, a seal 433 and columnar spacers 436 define a uniform gap between the touch panel 403 and the liquid crystal panel 402.

In this embodiment, a first touch panel substrate 431 is bonded to an outer surface of a second touch panel substrate 432 (facing away from the liquid crystal panel 402). The first touch panel substrate 431 functions as a polarizer for the liquid crystal panel 402. Transmitting transducers 434 and receiving transducers 435 are disposed on an inner surface of the second touch panel substrate 432 (facing the liquid crystal panel 402) so that surface acoustic waves propagate across the inner surface of the second touch panel substrate 432.

In this embodiment, additionally, a resin film 437 is bonded to an outer surface of a color filter substrate 405 of the liquid crystal panel 402 (facing the touch panel 403). The direction of the polarization axis of a polarizer 419 substantially agrees with the direction of the slow axis of the resin film 437 while the direction of the polarization axis of the first touch panel substrate 431 substantially agrees with the direction of the fast axis of the resin film 437. The rest of the structure of the liquid crystal device 401 is the same as in the first embodiment.

According to this embodiment, as described above, the first touch panel substrate 431 is bonded to the outer surface of the second touch panel substrate 432. If the second touch panel substrate 432 is broken, the first touch panel substrate 431 can cover the broken substrate 432 to prevent scattering of shards.

Although the first touch panel substrate 431 and the resin film 437 are illustrated as having similar thicknesses in FIG. 8, the thickness of the resin film 437 can be sufficiently reduced relative to that of the first touch panel substrate 431 because the resin film 437 suffers no damage from writing or touching. This allows for a reduction in the thickness of the liquid crystal device 401.

In writing or touching, the second touch panel substrate 432 comes into contact with the resin film 437. The resin film 437 sufficiently absorbs the surface acoustic wave W propagating across the surface of the second touch panel substrate 432 when the surface acoustic wave W passes through a portion of the second touch panel substrate 432 in contact with the resin film 437. The resin film 437 can therefore ensure high position detection performance.

In addition, the direction of the polarization axis of the polarizer 419 substantially agrees with the direction of the slow axis of the resin film 437 while the direction of the polarization axis of the first touch panel substrate 431 substantially agrees with the direction of the fast axis of the resin film 437. This prevents light from being blocked by the polarizer 419, the first touch panel substrate 431, or the resin film 437. The liquid crystal device 401 can therefore achieve high contrast.

In addition, the first touch panel substrate 431, which is a polarizer, can achieve significantly increased resistance to writing because the first touch panel substrate 431 is directly bonded to the outer surface of the second touch panel substrate 432, which is formed of, for example, glass or quartz.

Sixth Embodiment

A sixth embodiment of the invention will be described. In the drawings, as in the first embodiment, individual members are illustrated on different scales so that they have visible sizes. No description will be given of the same components as used in the first embodiment FIG. 9 is a plan view of columnar spacers 536 of a touch panel 503, corresponding to FIG. 2.

Figure 9:
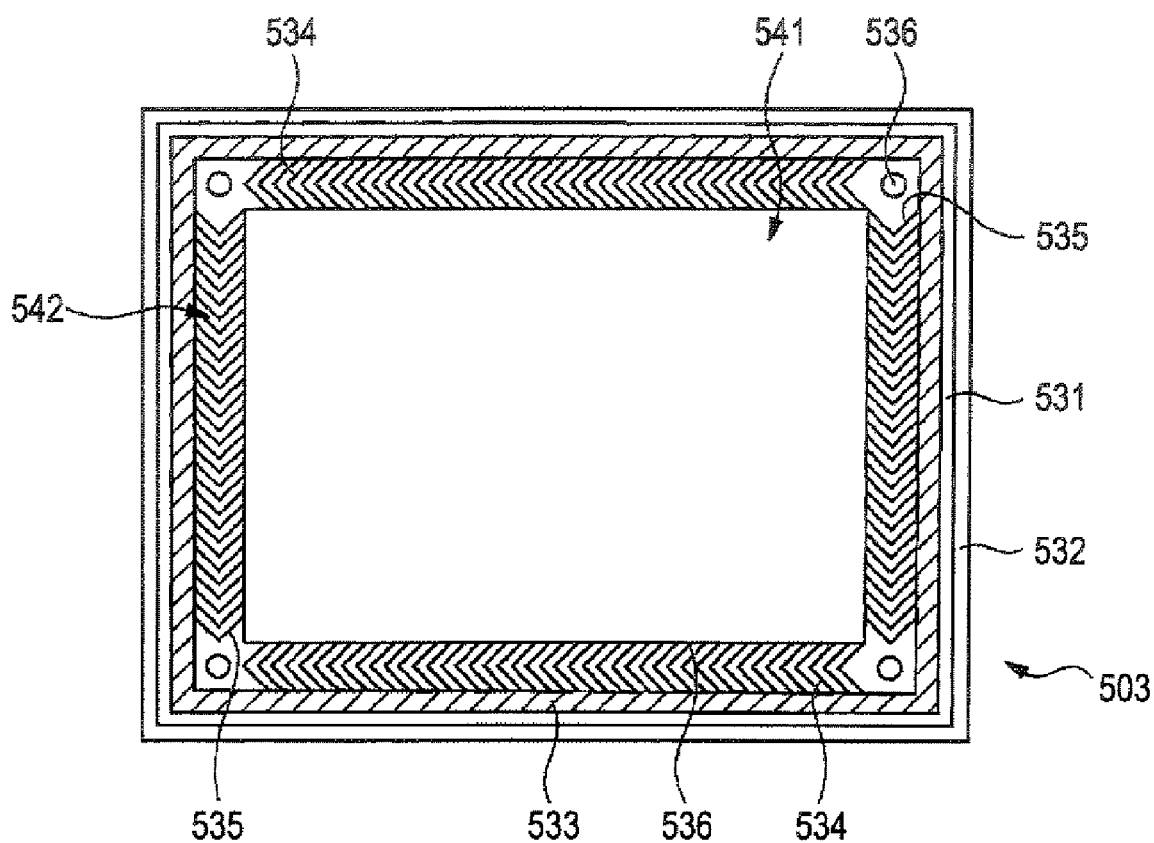
FIG. 9 is a plan view of a liquid crystal device according to a sixth embodiment of the invention.

In FIG. 9, transmitting transducers 534 are arranged at predetermined intervals along the upper and lower sides of a second touch panel substrate 532, and receiving transducers 535 are arranged at predetermined intervals along the left and right sides of the second touch panel substrate 532. The transmitting transducers 534 and the receiving transducers 535 are arranged so as to surround a propagation region 541 overlapping substantially the center of the second touch panel substrate 532. Surface acoustic waves propagate across the propagation region 541.

A peripheral region 542 where no surface acoustic wave propagates is defined between the propagation region 541 and a seal 533. In this embodiment, the columnar spacers 536 are not disposed in the propagation region 541, but are disposed at the corners of the peripheral region 542.

According to this embodiment, surface acoustic waves are not obstructed by the columnar spacers 536 because the spacers 536 are not disposed in the propagation region 541, but are disposed only in the peripheral region 542, where no surface acoustic wave propagates. This arrangement can minimize the dead area of the first touch panel substrate 531 to ensure high position detection performance.

Seventh Embodiment

An example of an electronic apparatus including any of the electrooptical devices described above will be described.

Figure 10:
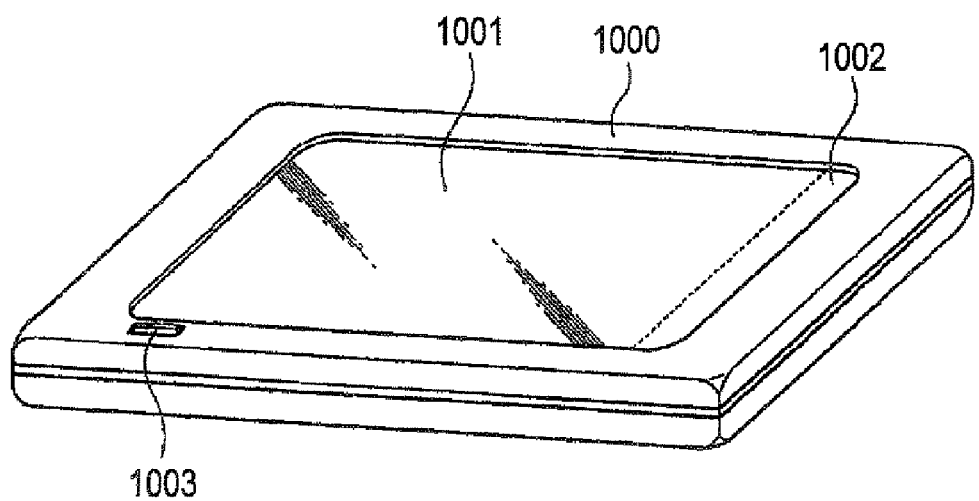
FIG. 10 is a schematic diagram of an electronic apparatus according to a seventh embodiment of the invention.

FIG. 10 is a perspective view of a handheld terminal 1000 as an example of an electronic apparatus according to a seventh embodiment of the invention In FIG. 10, the handheld terminal 1000 includes a touch panel 1001 serving as an input unit, function keys 1002, and a power switch 1003. Data is input into the handheld terminal 1000 by directly pointing to a position on the touch panel 1001 while viewing icons printed on the function keys 1002 or a screen of a liquid crystal panel (not shown) disposed below the touch panel 1001. This handheld terminal 1000 has high position detection performance because it includes any of the touch panels described above as an input unit.

The technical scope of the invention is not limited to the embodiments described above, and various modifications may be added without departing from the spirit of the invention.

For example, although a resin film disposed between polarizers has a birefringence phase difference of substantially zero in the embodiments described above, the resin film does not necessarily have to have a birefringence phase difference of substantially zero. The birefringence phase difference of the resin film and the directions of the slow and fast axes thereof may be selected so as to compensate for the birefringence phase difference of the liquid crystal panel 2. This prevents loss of light due to the birefringence phase difference to provide a liquid crystal device having high brightness and contrast.

Although liquid crystal panels are used as display panels in the embodiments described above, other types of display panels such as organic electroluminescent (EL) displays, plasma display panels (PDPs), and cathode-ray tubes (CRTs) may also be used.

Although columnar spacers are disposed between first and second touch panel substrates in the embodiments described above, other types of spacers such as spherical spacers may also be used. For example, the first and second touch panel substrates may be bonded with spherical spacers disposed therebetween by applying an adhesive to the spacers.

Although touch panels having chevron-shaped transducers have been mainly described in the embodiments above, the invention is not limited to these touch panels. For example, the invention may also be applied to touch panels having stepped transducers or those having reflective electrodes. The same advantages as in the embodiments described above can also be achieved in such cases.

The entire disclosure of Japanese Patent Application Nos: 2006-019157, filed Jan. 27, 2006 and 2006-282377, filed Oct. 17, 2006 are expressly incorporated by reference herein.

What is claimed is:

1. A touch panel comprising:
   a first touch panel substrate which includes resin film, the first touch panel substrate having a first face, the first touch panel being configured to, in response to a user touch, flex in a direction perpendicular to the first face;
   a second touch panel substrate which includes at least one of quartz and glass, the second touch panel substrate having a second face, the second touch panel being disposed such that the second face is directly opposite and parallel to the first face;
   a processor;
   a surface acoustic wave generator operatively coupled to the processor, the surface acoustic wave generator being configured to generate a surface acoustic wave having a duration which is associated with a value, the surface acoustic wave propagating across the second face in a predetermined direction;
   a surface acoustic wave sensor operatively coupled to the processor, the surface acoustic wave sensor being configured to sense the generated surface acoustic wave;
   spacers disposed between the first and second touch panel substrates along a path where the generated surface acoustic wave propagates from the surface acoustic wave generator to the surface acoustic wave sensor; and
   a memory device which stores instructions which when executed by the processor, cause the processor, in cooperation with the surface acoustic wave generator and the surface acoustic wave sensor, to, using the duration of the attenuation:
      (a) determine whether the attenuation was generated in response to the user touch; and
      (b) determine whether the attenuation was generated based on one of the spacers.

2. The touch panel of claim 1, wherein the instructions, when executed by the processor, cause the processor to operate with the surface acoustic wave generator and the surface acoustic wave sensor, to, determine that the attenuation was generated in response to the user touch when the value is larger than a predetermined amount.

3. The touch panel of claim 1, wherein the instructions, when executed by the processor, cause the processor to operate with the surface acoustic wave generator and the surface acoustic wave sensor, to, using the first duration, determine that the attenuation was generated based on one of the spacers when the value is smaller than a predetermined amount.

4. An electro-optical device comprising:
   a touch panel including:
      (a) a first touch panel substrate which includes resin film, the first touch panel substrate having a first face, the first touch panel being configured to, in response to a user touch, flex in a direction perpendicular to the first face;
      (b) a second touch panel substrate which includes at least one of quartz and glass, the second touch panel substrate having a second face, the second touch panel being disposed such that the second face is directly opposite and parallel to the first face;
      (c) a processor;
      (d) a surface acoustic wave generator operatively coupled to the processor, the surface acoustic wave generator being configured to generate a surface acoustic wave having a duration which is associated with a value, the surface acoustic wave propagating across the second face in a predetermined direction;
      (e) a surface acoustic wave sensor operatively coupled to the processor, the surface acoustic wave sensor being configured to sense the generated surface acoustic wave;
      (f) spacers disposed between the first and second touch panel substrates along a path where the surface acoustic wave propagates from the surface acoustic wave generator to the surface acoustic wave sensor; and
      (g) a memory device which stores instructions which when executed by the processor, cause the processor, in cooperation with the surface acoustic wave generator and the surface acoustic wave sensor, to, using the duration of the attenuation:
   (i) determine whether the attenuation was generated in response to a user touch; and
   (ii) determine whether the attenuation was generated based on one of the spacers; and
a display panel disposed opposite the touch panel and having a display surface where an image is displayed.

5. The electro-optical device of claim 2, wherein the first touch panel substrate includes a polarizer.

6. The electro-optical device of claim 3, which includes a resin film disposed on a surface of the first touch panel substrate facing the second touch panel substrate.

7. An electronic apparatus comprising:
a touch panel including:
   (a) a first touch panel substrate which includes resin film, the first touch panel substrate having a first face, the first touch panel being configured to, in response to a user touch, flex in a direction perpendicular to the first face;
   (b) a second touch panel substrate which includes at least one of quartz and glass, the second touch panel substrate having a second face, the second touch panel being disposed such that the second face is directly opposite and parallel to the first face;
   (c) a processor;
   (d) a surface acoustic wave generator operatively coupled to the processor, the surface acoustic wave generator being configured to generate a surface acoustic wave having a duration which is associated with a value, the surface acoustic wave propagating across the second face in a predetermined direction;
   (e) a surface acoustic wave sensor operatively coupled to the processor, the surface acoustic wave sensor being configured to sense the generated surface acoustic wave;
   (f) spacers disposed between the first and second touch panel substrates along a path where the surface acoustic wave propagates from the surface acoustic wave generator to the surface acoustic wave sensor; and
   (g) a memory device which stores instructions which when executed by the processor, cause the processor to operate with the surface acoustic wave generator and the surface acoustic wave sensor, to, using the duration of the attenuation:
      (i) determine whether the attenuation was generated in response to a user touch; and
      (ii) determine whether the attenuation was generated based on one of the spacers; and
a display panel disposed opposite the touch panel and having a display surface where an image is displayed.

* * * * *